Feb. 19, 1929.

G. S. MORLEY 1,702,518

COOKING APPARATUS

Filed Dec. 1, 1927

INVENTOR.
G. S. MORLEY
BY J. V. G. Cook
ATTORNEY

Feb. 19, 1929.
G. S. MORLEY
1,702,518
COOKING APPARATUS
Filed Dec. 1, 1927    2 Sheets-Sheet 2
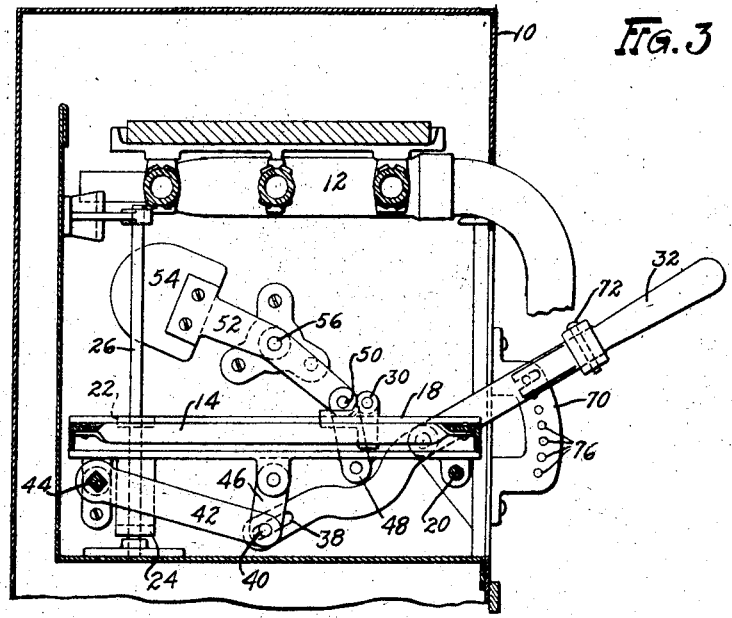
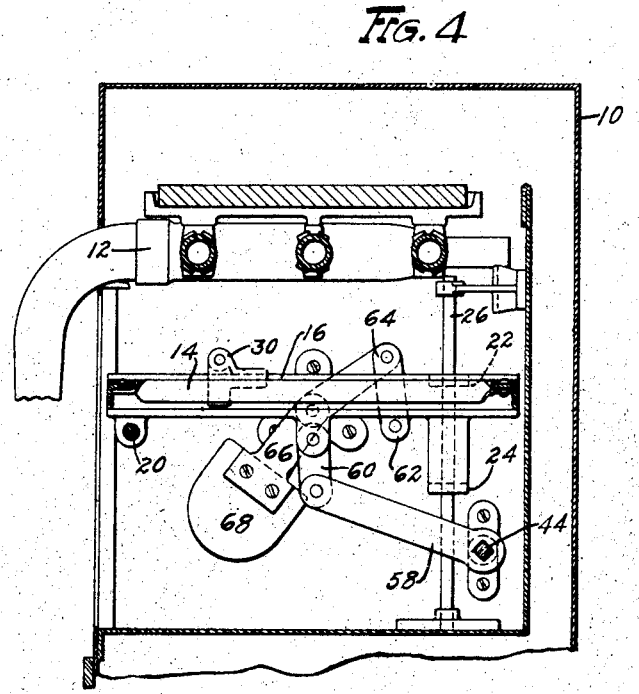
INVENTOR
G. S. MORLEY
BY J. H. G. Cook
ATTORNEY Patented Feb. 19, 1929.

1,702,518

UNITED STATES PATENT OFFICE.

GUILFORD S. MORLEY, OF UNIVERSITY CITY, MISSOURI, ASSIGNOR TO MAJESTIC MANUFACTURING COMPANY, OF ST. LOUIS, MISSOURI, A CORPORATION OF MISSOURI.

COOKING APPARATUS.

Application filed December 1, 1927. Serial No. 236,895.

This invention relates to cooking apparatus, and is illustrated herein as embodied in a vertically adjustable grid suitable for use in the ovens of gas stoves and the like.

It is a matter of common knowledge that, in the use of a gas stove, it is often desirable to place the food being cooked nearer to or farther away from the flame, as may be desired. Accordingly, it is an object of the present invention to provide a grid for an oven which may be adjusted vertically to cause the grid to approach or recede from the flame which is burning in the top part of the oven. In the stove manufacturing art, a movable grid of this character is commonly termed a "salamander," and, with a view to rendering more clear the description, the latter term will be hereinafter employed in denoting the vertically adjustable grid.

The parallel bars contained in the salamander grid are extremely heavy, and thus it will be seen that, unless some mechanism is provided to overcome the disadvantage, it would be extremely awkward, and even difficult, to attempt to raise and lower the grid by the use of a pivoted lever. In view of this fact the present invention has for an important feature thereof the provision in a salamander of means associated with a grid for causing the grid to be capable of manual operation in a smooth and facile manner. In the illustrated embodiment of the invention, the grid of the salamander has associated with it a counterbalance, which tends to accelerate the upward movement of the grid and to retard the downward movement of the grid. It will therefore be seen that, as the grid tends to move downwardly by reason of its own weight, this tendency is counteracted by means of the weight, and conversely, the weight serves in moving the grid when it is being lifted against its own weight.

Another feature of the invention consists in the provision in a salamander of a grid adjustable in a vertical direction and controlled positively during such movement. Heretofore, it is believed, salamanders have generally been constructed in such a manner that the grids, instead of moving in a strictly vertical direction, move upwardly or downwardly in a sloping path. While such a construction is successful for most purposes, it will be appreciated that where a grid in its lowermost position is disposed with its forward edge extending through the open door of the oven, one unfamiliar with the operation of the stove might inadvertently operate the salamander to lower the grid while the door was closed, in which event the stove might conceivably be damaged, and food resting on the grid would quite likely be spilled. In the present invention the grid, as pointed out above, may be raised or lowered in a true vertical direction, and a vertical guide is provided for controlling the path of this movement.

Other features and objects of the invention will become apparent from a reading of the following specification in the light of the accompanying drawings, in which—

Fig. 3 is a view similar to Fig. 2, showing the grid of the salamander in a lowered, instead of a raised, position; and Fig. 4 is a view similar to Fig. 2 of the left-hand end of the salamander, in which the grid is in a raised position.

Figure 1:
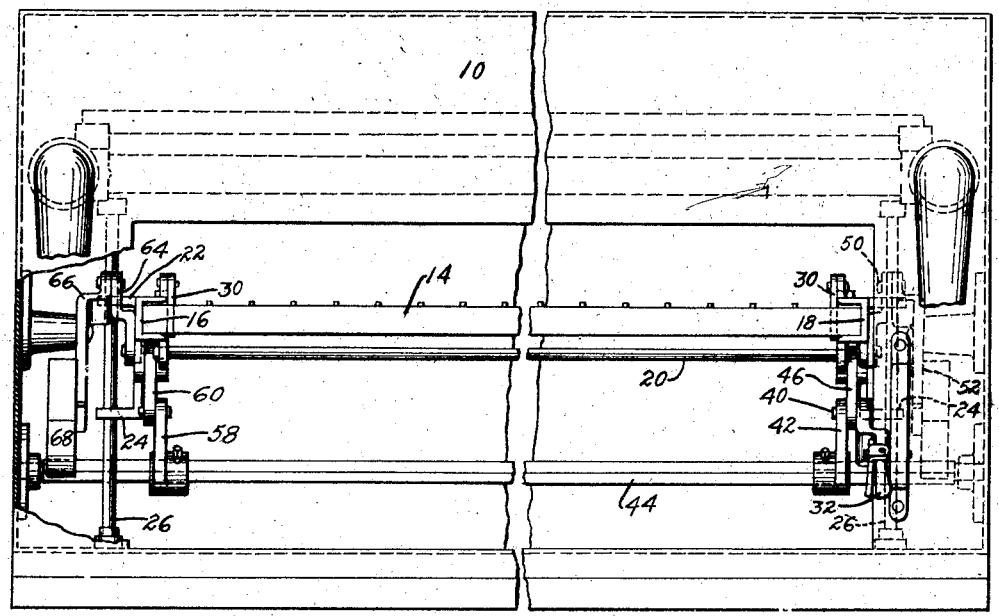
Fig. 1 is a view in front elevation of an oven with certain parts broken away, to the end of illustrating the construction and arrangement of a salamander located within the oven.

As shown in the drawings, the reference numeral 10 indicates the casing of an oven containing a number of gas burners 12 for heating the oven. The food which is being cooked within the oven is adapted to rest upon a rectangular grid 14 composed of a plurality of parallel bars, which is adapted to slide horizontally in a pair of U-shaped brackets 16, 18 located at opposite ends of the oven. The forward ends of the U-shaped brackets are secured to each other by means of a tie rod 20, and the rear extremities of the brackets are each provided with ears 22 and 24, which are spaced apart to provide a plurality of bearing surfaces. The ears are bored out separately, and vertical guide rods 26, 26, located at opposite ends of the oven, are adapted to pass through the openings formed within the ears and to support the grid in a horizontal position. The rods 26, 26 are rigidly secured, as illustrated, to the floor and back wall of the oven. The grid may be slid forwardly through the opening in the front of the oven to render it more accessible in cooking, and each of the U-shaped brackets 16, 18 is provided with a stop 30 which projects downwardly between the bars of the grid and limits the forward movement of the grid.

Turning now to the means for raising and lowering the grid, an operating lever 32, which extends through a slot formed in one end of the stove, is pivoted at 34, intermediately between its ends, to a stationary abutment 36 and has its forward end provided with a slot 38 for receiving a cylindrical pin 40. The pin 40 is carried at one end of a link 42, which has its opposite end rigidly connected to a rock shaft 44, which extends across the rear of the oven. An intermediate connecting link 46 serves to connect the pin 40 and hence the lever 32 and the link 42 with the U-shaped bracket 18.

Figure 2:
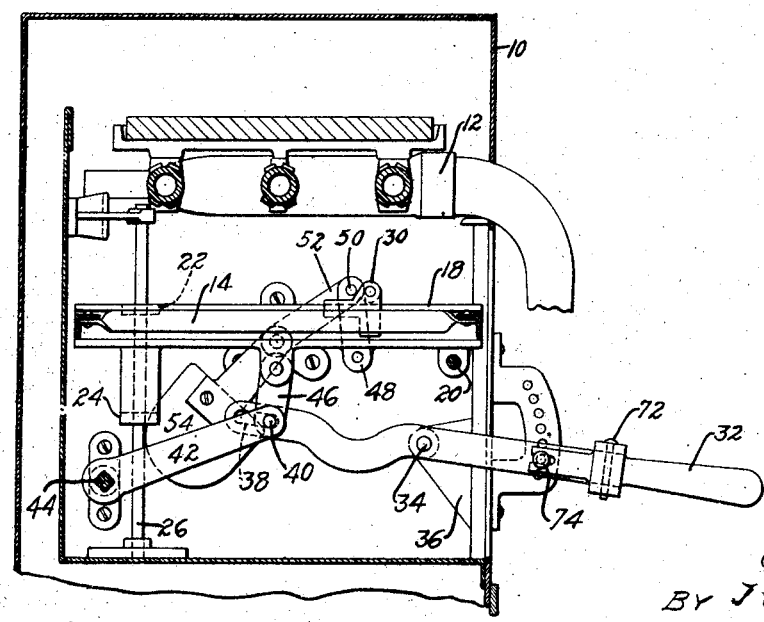
Fig. 2 is a view in section, showing the construction and arrangement of the right-hand end of the salamander as viewed from the front in Fig. 1.

From so much of the description as has been given, it will be seen that the handle of the operating lever 32 could be raised from the position illustrated in Fig. 2 to permit the grid 14 to be lowered, and, on the other hand, the handle could be lowered from the position shown in Fig. 3 forcibly to raise the grid. To the end of rendering more easy this raising and lowering of the grid, the U-shaped bracket 18 is provided with a downwardly extending lug 48, to the outer side of which there is secured a connecting link 50 having its opposite end pivotally secured to a bell crank lever arm 52 having a counterbalance 54 secured at one of its ends. The lever 52 is pivoted at 56 to a stud which projects upwardly from one of the end walls of the oven.

The description just given relates to the construction of that part of the salamander operating mechanism which is located at the right hand of the oven, as viewed from the front in Fig. 1. The left hand as viewed in that figure is not provided with an operating handle, and hence the construction of this latter part of the mechanism, while very similar, is more simple. As shown in Fig. 4, the rack bar 44 has a link 58 connecting with an intermediate link 60, which is in turn pivotally secured to the U-shaped bracket 16. A downwardly projecting lug 62 on the underside of the U-shaped bracket 16 has a connecting link pivotally secured thereto, and the opposite end of the connecting arm is pivoted to a bell crank lever arm 66 which carries a counterweight 68.

In the operation of the device, upon the handle 32 being moved downwardly from the position shown in Fig. 3, the grid moves upwardly and the counterweights 54, 68 move downwardly to assist in the upward movement, which, of course, is against the weight of the grid 14 and the U-shaped brackets 16, 18. On the other hand, as the grid moves downwardly—its own weight tending to produce this movement—the counterweight must move upwardly, thereby overcoming the tendency on the part of the grid to fall upon the operating lever 32 being released. A bracket 70 extends from the forward portion of the oven, and the handle of the operating lever 32 is pivoted at 72 and carries a pin 74, which, upon the handle being pivoted, may be removed from one of a series of notches 76 to permit adjustment of the operating lever 32 and the grid 14. The notches 76, together with the pin 74, provide means whereby the salamander may be moved into and held in a desired position of adjustment.

While the invention has been described herein with particular reference to the grid of a gas stove, it is to be understood that the invention contemplates employment in analogous devices, and in stoves of different types.

Having thus described my invention, what I claim as new and desire to secure by Letters Patent of the United States is:

1. A salamander comprising a grid, a connecting link having one of its ends pivotally secured to the grid, and a plurality of additional links having their inner ends pivotally secured to the connecting link, both of the additional links being also pivoted at fixed points, one of the additional links terminating in a handle for use in raising and lowering the grid.

2. A salamander comprising a plurality of horizontally extending brackets, a grid slidably supported by the brackets, connecting links extending from a point substantially adjacent to the center of the brackets and having their ends connected to a plurality of pivotal links, an additional plurality of connecting links secured to the brackets, the additional plurality being connected also with counterbalances pivoted substantially midway of their lengths, and means connected with one of the first named connecting links for imparting movement to the brackets and the grid.

3. A salamander comprising a grid, a connecting link having one of its ends pivotally secured to the grid, a plurality of additional links having their ends pivotally secured to the connecting link, both of the additional links being also pivoted at fixed points and one thereof being loosely secured to said connecting link, and vertically extending means for guiding the grid during its vertical movement.

In testimony that I claim the foregoing I hereunto affix my signature.

GUILFORD S. MORLEY.